United States Patent

Sakaguchi

[11] Patent Number: 6,141,568
[45] Date of Patent: Oct. 31, 2000

[54] BATTERY SAVING IN PORTABLE RADIO APPARATUS

[75] Inventor: Kazuaki Sakaguchi, Kanagawa, Japan

[73] Assignee: NEC Corporation, Tokyo, Japan

[21] Appl. No.: 09/015,037

[22] Filed: Jan. 28, 1998

[30] Foreign Application Priority Data

Feb. 7, 1997 [JP] Japan .................................. 9-024944

[51] Int. Cl.[7] .................................................. H04B 1/38
[52] U.S. Cl. .......................... 455/566; 455/90; 455/550; 455/574
[58] Field of Search .................. 455/58.3, 38.4, 455/67.1, 566, 574, 127, 343, 550, 90; 713/340, 321–323

[56] References Cited

U.S. PATENT DOCUMENTS

| | | | |
|---|---|---|---|
| 3,877,001 | 4/1975 | Bogut et al. | 455/127 |
| 4,536,761 | 8/1985 | Tsunoda et al. | 455/38.4 |
| 5,881,377 | 3/1999 | Giel et al. | 455/343 |
| 5,894,580 | 4/1999 | Yoshida | 713/340 |

FOREIGN PATENT DOCUMENTS

| | | |
|---|---|---|
| 0 376 510 | 7/1990 | European Pat. Off. . |
| 57-25734 | 2/1982 | Japan . |
| 61-66897 | 5/1986 | Japan . |
| 61-189030 | 8/1986 | Japan . |
| 4-263305 | 9/1992 | Japan . |
| 5-327587 | 12/1993 | Japan . |
| 6-140979 | 5/1994 | Japan . |
| 7-131511 | 5/1995 | Japan . |
| 9-261750 | 10/1997 | Japan . |
| 2 255 663 | 11/1992 | United Kingdom . |
| 2 316 837 | 3/1998 | United Kingdom . |

Primary Examiner—Reinhard J. Eisenzopf
Assistant Examiner—Lester G Kincaid
Attorney, Agent, or Firm—Scully, Scott Murphy & Presser

[57] ABSTRACT

In a portable radio apparatus, a displaying unit displays predetermined information in response to an ON signal and stops the display of the information in response to an OFF signal. An operation unit with buttons including specified buttons generates a start signal in response to operation of any of the specified buttons by a user. A detecting section generates a display request in response to the start signal. A control section issues the ON signal to the displaying unit in response to the display request from the detecting section and the OFF signal to the displaying unit such that the predetermined information is displayed on the displaying unit for a time period equal to or longer than a predetermined time period.

20 Claims, 4 Drawing Sheets

PORTABLE RADIO APPARATUS

PORTABLE RADIO APPARATUS

BATTERY SAVING IN PORTABLE RADIO APPARATUS

BACKGROUND OF THE INVENTION

1. Field of the Invention

The present invention relates to a portable radio apparatus such as a portable telephone and a portable computer, and particularly relates to battery power saving technique in a portable radio apparatus which has a battery and a backlighting type liquid crystal display unit.

2. Description of the Related Art

A portable radio apparatus such as a portable telephone and a portable computer generally includes an image display section on which transmitted or received information is displayed. Such an image display section is often made of a liquid crystal display section, which is lighted up by a lighting source such as a backlighting source to make it easy to confirm the information. When a user regards the lighting as unnecessary in the daytime, the user freely operates a button to turn off the backlighting source so that the battery power can be saved.

Another information such as use state information, for example, the reception electric field strength, the remaining battery power and so on, is also displayed in addition to the transmitted or received information. Such a use state information is effective if the user regards the information as the warning. Therefore, the lighting is wasteful when the portable radio apparatus is kept without being used, when it is ready for receiving or transmitting a radio signal, and when the user does not look at the image display section. Thus, it is desirable that a backlight is turned off by means of turning-off means in the above cases so as to save the power of the battery. It is more desirable that the use state information is not displayed to save the battery power while the information is unnecessary.

Such a desirable portable radio apparatus is described in Japanese Laid Open Patent Disclosure (JP-A-Heisei 5-327587), in which the portable radio apparatus includes an power supply control circuit provided between a liquid crystal display circuit (LCD) and a power supply circuit. A CPU controls the power supply control circuit to turn on or off the liquid crystal display circuit. According to such a known means, the battery power supply is controlled in the use state to restrain the supply of power to the LCD displaying circuit while the portable radio apparatus is kept without being used, while it is waiting to receive, and while communication is performed.

By the way, the above reference has no significant ideas as to how the CPU determines whether the portable radio apparatus is kept without being used, it is ready to receive transmission data, or it is communicating. Another problem to be solved remains in which since the power supply control circuit is added, the number of parts increases so that the portable radio apparatus becomes complicated, resulting in high manufacture cost.

In addition to the above reference, a technique for battery saving is disclosed in Japanese Laid Open Patent Disclosure (JP-A-Heisei 4-263305), in which no supply of display data to a LCD display section is detected such that the supply of battery power to the LCD display section is stopped, and the battery power supply is restarted by contact detecting means.

In Japanese Laid Open Utility Model (JU-A-Showa 61-66897), a backlight is turned on for a predetermined time period after a key is operated.

In Japanese Laid Open Patent Disclosure (JP-A-Heisei 6-140979), the technique is described in which a photosensor is provided and the message display is turned off in a dark place.

SUMMARY OF THE INVENTION

The present invention is accomplished to solve the above problems. Therefore, an object of the present invention is to provide a portable radio apparatus such as a portable telephone and a portable computer, the liquid crystal display section which is controlled to be automatically turned on and off so as to save battery power, and a method for the same.

Another object of the present invention is to provide a portable radio apparatus which is lowered in cost without any complicated device of the driving electric source control circuit.

In order to achieve an aspect of the present invention, a portable radio apparatus includes a displaying unit for displaying predetermined information in response to an ON signal and for stopping the display of the information in response to an OFF signal, an operation unit with buttons including specified buttons, for generating a start signal in response to operation of any of the specified buttons by a user, a detecting section for generating a display request in response to the start signal, and a control section for issuing the ON signal to the displaying unit in response to the display request from the detecting section and the OFF signal to the displaying unit such that the predetermined information is displayed on the displaying unit for a time period equal to or longer than a predetermined time period.

The detecting section desirably determines whether the predetermined information is displayed on the displaying unit, and generates the display request in response to the start signal when it is determined that the predetermined information is not displayed on the displaying unit.

The portable radio apparatus may further include a timer which starts to count the predetermined time period in response to the display request, and generates an end signal when the predetermined time period elapses. The control section issues the ON signal to the displaying unit in response to the display request and the OFF signal to the displaying unit in response to the end signal. In this case, the detecting section determines whether the predetermined information is displayed on the displaying unit, and issues the display request to the control section and the timer in response to the start signal when it is determined that the predetermined information is not displayed on the displaying unit. The detecting section generates a reset request in addition to the display request in response to the start signal when it is determined that the predetermined information is displayed on the displaying unit. In this case, the timer restarts to count the predetermined time period in response to the reset request. Also, the operation unit may change the predetermined time period of the timer in response to operation of any of the buttons by a user.

Also, the portable radio apparatus may further include a battery and a receiving unit for receiving a radio signal. In this case, the predetermined information is use state information including at least one of a remaining battery power quantity and electric field strength of the radio signal.

Further, the displaying unit may include a display screen and a light source which is turned on in response to the ON signal to back-light the display screen and which is turned off in response to the OFF signal.

In another aspect of the present invention, a method of saving battery power in a portable radio apparatus is provided, the method includes the steps of:

starting display of predetermined information on a displaying unit in response to operation of any of specified buttons of an operation unit; and stopping the display of the predetermined information on the displaying unit in response to an OFF signal which is generated after the start of the display by a predetermined time period.

In the starting step, it is detected whether any of the specified buttons is operated, and an ON signal is generated when it is determined that any of the specified buttons is operated, wherein the predetermined information is displayed on the displaying unit in response to the ON signal.

Further, in the starting step, it may be determined whether the predetermined information is displayed on the displaying unit when it is determined that any of the specified buttons is operated. Also, the ON signal may be generated when it is determined that the predetermined information is not displayed on the displaying unit.

The stopping step includes counting the predetermined time period by a timer, and the OFF signal is generated when the predetermined time period elapses.

In the starting step, a reset request is generated to reset the timer, when it is determined that the predetermined information is displayed on the displaying unit. Also, the predetermined time period of the timer may be changed in response to operation of any of buttons of the operation unit by a user.

In order to achieve still another aspect of the present invention, a portable radio apparatus includes a displaying unit with a display screen, for displaying predetermined information in response to an ON signal and for stopping the display of the information in response to an OFF signal, a detecting section for estimating whether a user looks at the display screen, and generating a display request based on the estimating result, and a control section for issuing the ON signal to the displaying unit in response to the display request from the detecting section and the OFF signal to the displaying unit such that the predetermined information is displayed on the displaying unit for a time period equal to or longer than a predetermined time period.

DESCRIPTION OF THE PREFERRED EMBODIMENTS

A portable radio apparatus of the present invention will be described below in detail with reference to the accompanying drawings.

Figure 1:
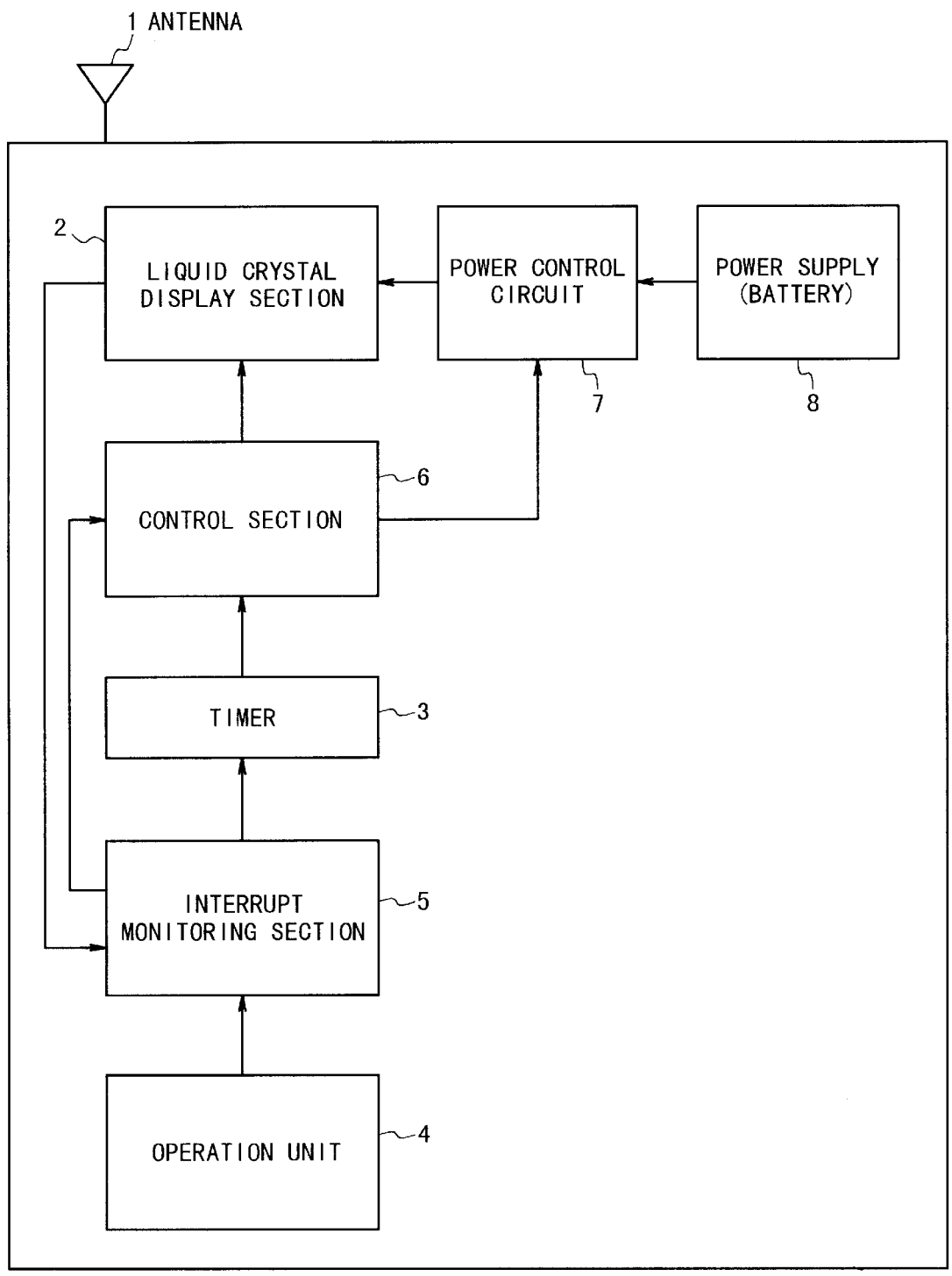
FIG. 1 is a block diagram illustrating the structure of a portable radio apparatus according to a first embodiment of the present invention.

FIG. 1 shows the structure of the portable radio apparatus according to the first embodiment of the present invention. Referring to FIG. 1, the portable radio apparatus is composed of an antenna 1, a liquid crystal displaying section (LCD) 2, a timer 3, an operation section 4 having buttons or keys, an interrupt monitoring section 5, a control section 6, a power control circuit 7, a battery power supply 8 and a transmitting and receiving section (not shown).

The transmitting and receiving section communicates with another apparatus or a base station via the antenna 1. The transmitting and receiving section amplifies and demodulates a received radio signal and modulates a data signal and drives the antenna 1.

The liquid crystal display section displays communication information to be received or transmitted, and use state information such as an electric field strength when a radio signal is received and a remaining battery power quantity. The timer 3 counts the lighting time of a built-in backlight source (not shown) which lights up the liquid crystal display section 2.

The operation section 4 has buttons or keys and is used to select various kinds of functions such as a transmission operation and a reception operation. Some of the buttons are specified buttons. The specified buttons are a transmission key, a reception key, a set of dialing keys, and so on.

The interrupt monitoring section 5 always monitors various interrupts in the use state. The interrupt monitoring section 5 also monitors an input signal generated in response to an operation of any of specified buttons of the operation section 4 to generate a display request. The interrupt monitoring section 5 further detects, in response to the input signal as the interrupt signal, whether information is displayed on the liquid crystal display section 2.

The control section 6 such as a micro-computing section performs the whole control of the portable radio apparatus such as a power supply control, a hardware control, a software control, and a memory control based on input and output signals sent from the above mentioned sections. The control section 6 generates an ON signal in response to the display request and an OFF signal in response to an end signal from the timer 3 which is generated when a predetermined time period of the timer 3 elapses. The ON signal and OFF signal are supplied to the power control circuit 7 to control the supply of power from the battery power supply 8 to the liquid crystal display section 2.

Figure 2:
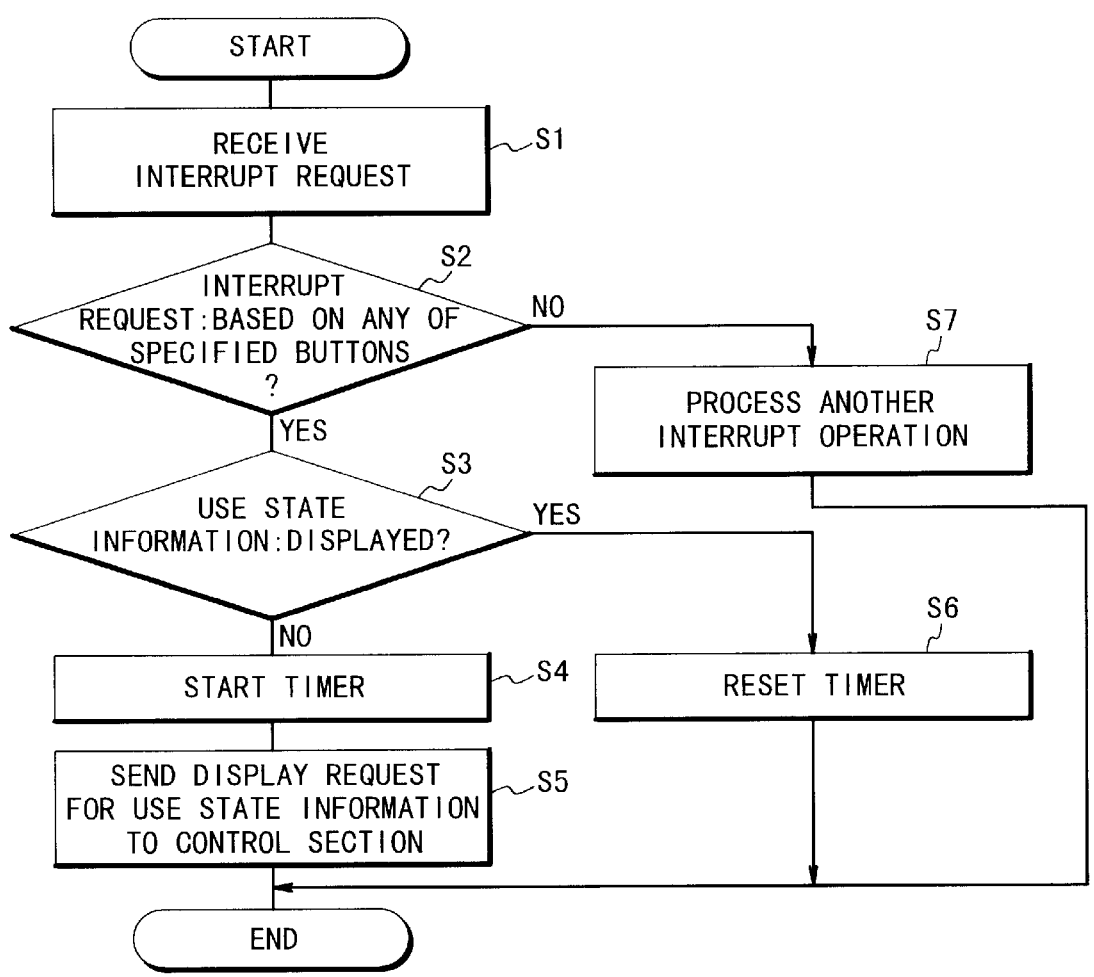
FIG. 2 is a flow chart to describe the operation of the portable radio apparatus according to the first embodiment of the present invention.

Next, the operation of the above mentioned portable radio apparatus with reference to FIG. 2 which shows a flow chart.

When the power of the battery is turned on, the portable radio apparatus is set to the ON state in which the portable radio apparatus can transmit and receive a radio wave signal. The control section 6 controls the whole of communications based on the input and output signals from the various sections. The interrupt monitoring section 5 starts to monitor any interrupt request (step 1). When a user manipulates any of the specified buttons for a transmission operation or reception operation, for example, an operation signal is issued to the interrupt monitoring section 5 as an interrupt request.

In a step S2, the interrupt monitoring section 5 determines whether a received interrupt request is generated in response to the operation of any of the specified buttons of the operation section 4. When the answer is yes, i.e., when it is determined that the received interrupt request is generated in response to the operation of any of the specified buttons, the interrupt monitoring section 5 determines that the user looks at the liquid crystal display section 2 while manipulating any of the specified buttons. In other words, the interrupt monitoring section 5 determines that it is necessary for the user to be given a notice or warning such as the electric field strength or remaining battery power quantity.

When it is determined that the user looks at the liquid crystal display section 2, the interrupt monitoring section 5 checks to see whether the backlight is turned on and the use state information is displayed on the display section 2 (step S3).

When it is determined to be NO in a step S3, i.e., when confirming that the use state information is not displayed, the interrupt monitoring section 5 sends a start request to the timer 3. The timer 3 starts to count a display time period in response to the start request (step S4). Also, the interrupt monitoring section 5 sends a display request to the control section 6. The control section 6 controls the liquid crystal display section 2 and the power control circuit 7 in response to the display request to display the use state information during the display time period. That is, in response to the display request, the control section 6 sends the ON signal to the liquid crystal display section 2 and the power control circuit 7 (step S5). The display section 2 and the power control circuit 7 are turned on in response to the ON signal to display the use state information for the display time period set by the timer 3. The time interval from the detection of no display of the use state information to the display of the use state information is very much shorter.

When the display time period elapses, the timer 3 issues an end request to the control section 6. The control section 6 issues an OFF signal to the liquid crystal display section 2 and the power control circuit 7 in response to the end request. The liquid crystal display section 2 and the power control circuit 7 are turned off in response to the OFF signal such that the use state information disappears, after the display time period elapses.

There is another case that the display section 2 has been already turned on to display the use state information, when the user manipulates any of the specified buttons while looking at the display section 2. That is, in a step S3, when it is determined that the use state information is displayed on the display section 2, the interrupt monitoring section 5 sends a reset request to the timer 3 to reset the display time period.

On the other hand, in the step S2, when the interrupt monitoring section 5 determines that the interrupt request is not generated based on the operation of any of the specified buttons by the user, the control advances to a step S7. That is, it is determined that the user does not look at the liquid crystal display section 2. In this case where the interrupt monitoring section 5 determines that the user does not look at the display section 2, the interrupt monitoring section 5 considers that the portable radio apparatus is kept out of use or under communication, or it is waiting for receiving radio wave. Such consideration enables control of the operation of the portable radio apparatus so that the use state information can be displayed on the display section 2 without any wasteful power consumption.

Next, the portable radio apparatus according to the second embodiment of the present invention will be described.

Figure 3:
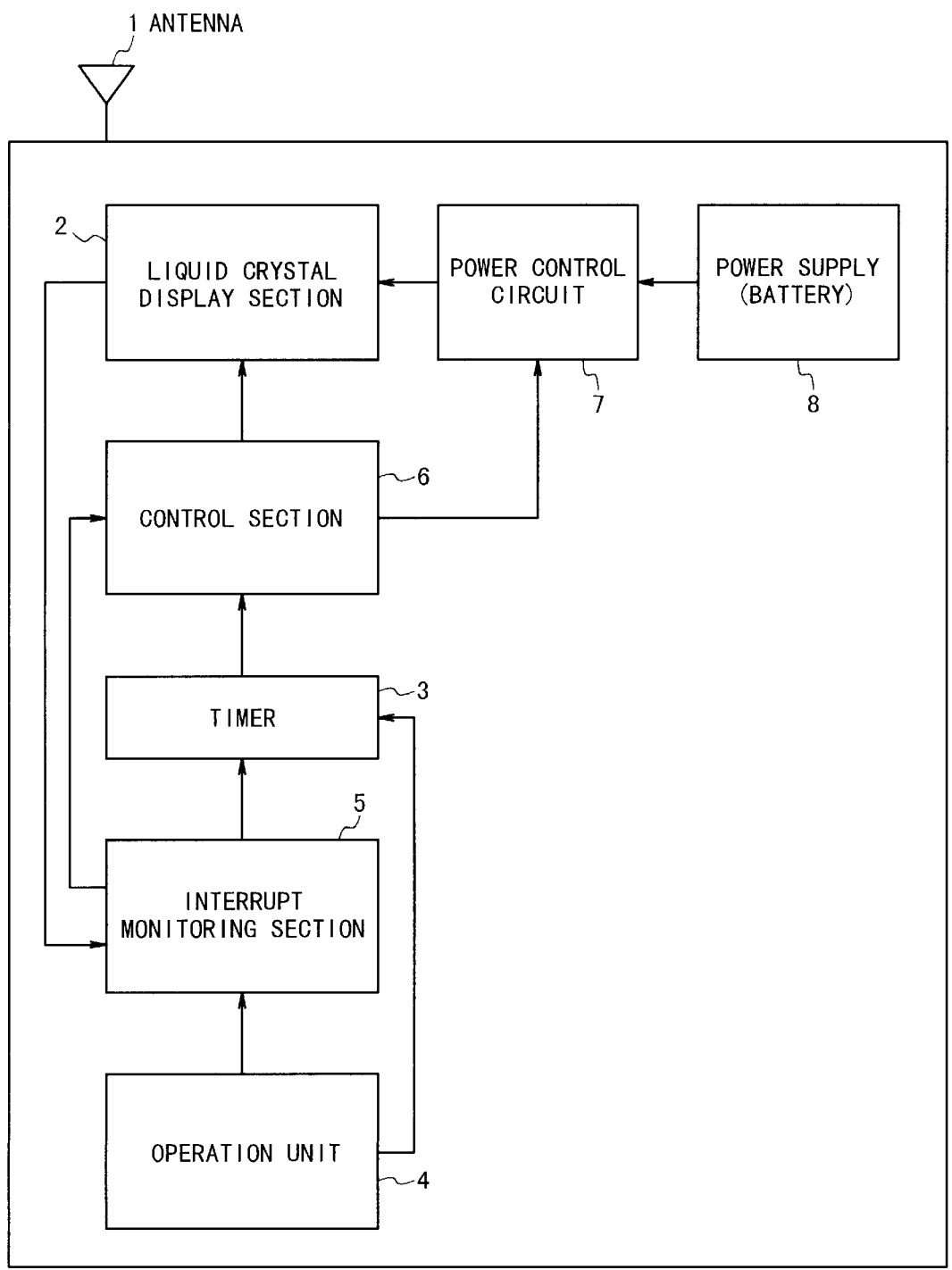
FIG. 3 is a block diagram illustrating the structure of a portable radio apparatus according to a second embodiment of the present invention.

FIG. 3 is a block diagram showing the structure of the portable radio apparatus in the second embodiment. Referring to FIG. 3, the portable radio apparatus in the second embodiment is different from that in the first embodiment in that the display time period in the timer 3 can be set in response to an input from the operation section 4.

Figure 4:
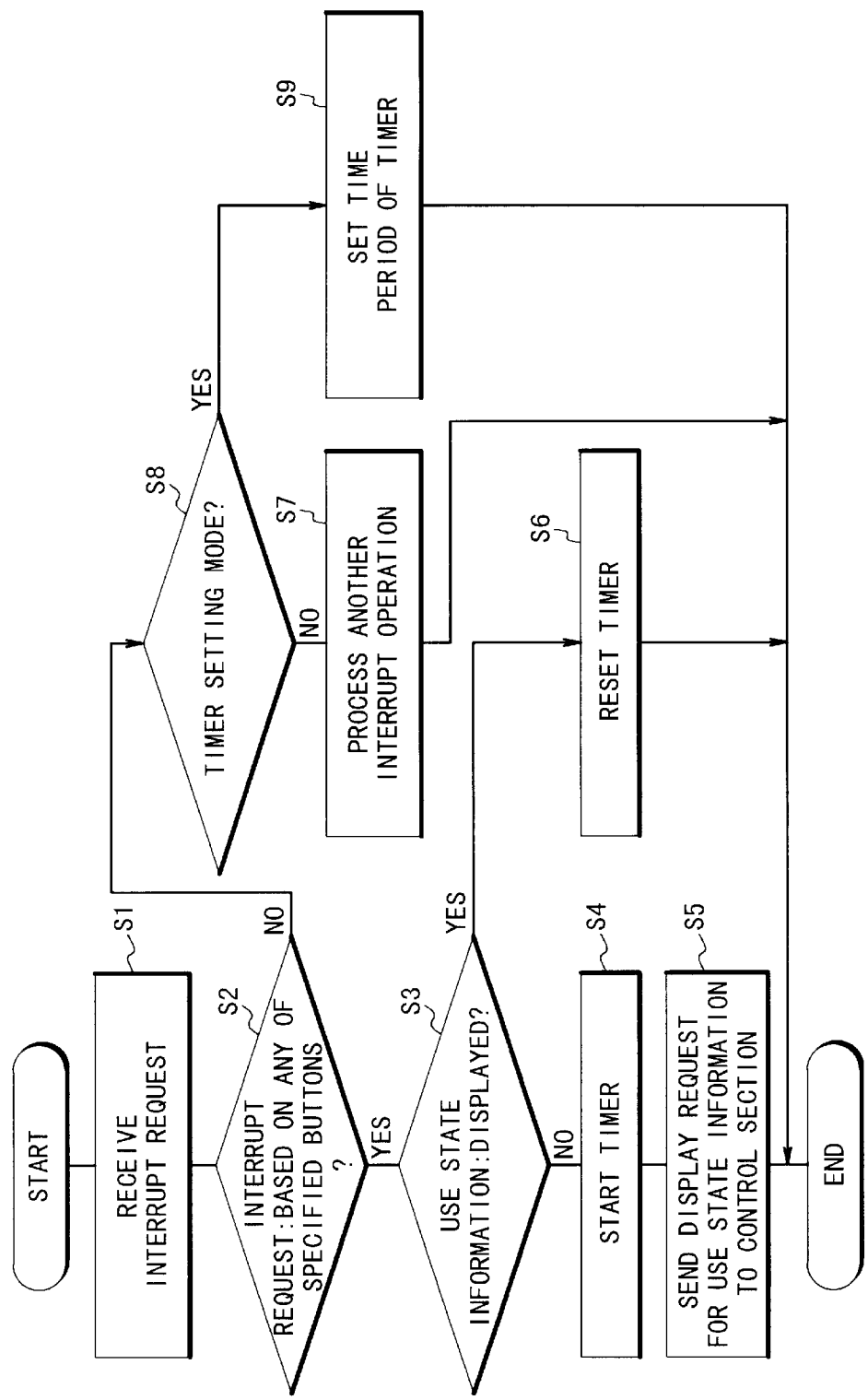
FIG. 4 is a flow chart to describe the operation of the portable radio apparatus according to the second embodiment of the present invention.

FIG. 4 is a flow chart to describe the operation of the portable radio apparatus in the second embodiment. Referring to FIG. 4, when it is determined that an input interrupt request is not based on the operation of any of the specified buttons, a step S8 is executed. In the step S8, it is determined whether a timer setting mode is set in response to the interrupt request. When the timer setting mode is set in response to the interrupt request, the timer 3 changes the display time period based on the following operation of any of the buttons of the operation section 4 in response to a request from the interrupt monitoring section 5 in a step S9.

Other steps are the same as those shown in FIG. 2.

As described above, according to the portable radio apparatus of the present invention, the presence or absence of any interrupt request generated based on the operation of any of the specified buttons such as the dialing buttons is checked at all times. If such an interrupt request is present, the portable radio apparatus understands or considers that the user is looking at the liquid crystal display section 2 while the user manipulates the buttons. The portable radio apparatus resultantly understands or considers that the use state information should be displayed to the user for any warning or announcement. If such an interrupt request is absent, the portable radio apparatus understands or considers that the user does not look at the picture of display section 2, or it is kept out of use, or it is waiting for receiving radio wave or under communication. In such a case, the liquid crystal display section and the backlight are turned off to save the electric power so that it is not wastefully used or it does not wastefully display any use state information.

What is claimed is:

1. A portable radio apparatus comprising;
a displaying unit for displaying predetermined information in response to an ON signal and for stopping the display of the information in response to an OFF signal;
an operation unit with a plurality of buttons including specified buttons, for generating a start signal in response to operation of any of the specified buttons by a user, the specified buttons being determined from the plurality of buttons to require display of said predetermined information on said displaying unit, the specified buttons being a subset of and less then the plurality of buttons;
a detecting section for generating a display request in response to said start signal; and
a control section for issuing said ON signal to said displaying unit in response to said display request from said detecting section and said OFF signal to said displaying unit such that said predetermined information is displayed on said displaying unit for a time period equal to or longer than a predetermined time period.

2. A portable radio apparatus according to claim 1, wherein said detecting section determines whether said predetermined information is displayed on said displaying unit, and generates said display request in response to said start signal when it is determined that said predetermined information is not displayed on said displaying unit.

3. A portable radio apparatus according to claim 1, further comprising a timer which starts to count said predetermined time period in response to said display request, and generates an end signal when said predetermined time period elapses, and
wherein said control section issues said ON signal to said displaying unit in response to said display request and said OFF signal to said displaying unit in response to said end signal.

4. A portable radio apparatus according to claim 3, wherein said detecting section determines whether said predetermined information is displayed on said displaying unit, and issues said display request to said control section and said timer in response to said start signal when it is determined that said predetermined information is not displayed on said displaying unit.

5. A portable radio apparatus according to claim 4, wherein said detecting section generates a reset request in addition said display request in response to said start signal when it is determined that said predetermined information is displayed on said displaying unit, and wherein said timer restarts to count said predetermined time period in response to said reset request.

6. A portable radio apparatus according to claim 3, wherein said operation unit changes said predetermined time period of said timer in response to operation of any of the buttons by a user.

7. A portable radio apparatus according to claim 1, further comprising a battery and a receiving unit for receiving a radio signal, and wherein said predetermined information is use state information including at least one of a remaining battery power quantity and electric field strength of said radio signal.

8. A portable radio apparatus according to claim 1, wherein said displaying unit includes a display screen and a light source which is turned on in response to said ON signal to back-light said display screen and which is turned off in response to said OFF signal.

9. A method of saving battery power in a portable radio apparatus, comprising the steps of:

determining a set of specified buttons, from a plurality of buttons on an operation unit, that require display of predetermined information on a displaying unit, the specified buttons being a subset of and less then the plurality of buttons;

starting display of said predetermined information on said displaying unit in response to operation of any of said specified buttons of said operation unit; and stopping the display of said predetermined information on said displaying unit in response to an OFF signal which is generated after said start of said display by a predetermined time period.

10. A method according to claim 9, wherein said starting step includes:

detecting whether any of said specified buttons is operated;

generating an ON signal when it is determined that any of said specified buttons is operated, wherein said predetermined information is displayed on said displaying unit in response to said ON signal.

11. A method according to claim 10, wherein said starting step further comprises the steps of:

determining whether said predetermined information is displayed on said displaying unit when it is determined that any of said specified buttons is operated; and generating said ON signal when it is determined that said predetermined information is not displayed on said displaying unit.

12. A method according to claim 11, wherein said stopping step includes:

counting said predetermined time period by a timer; and generating said OFF signal when said predetermined time period elapses.

13. A method according to claim 12, wherein said starting step includes generating a reset request to reset said timer, when it is determined that said predetermined information is displayed on said displaying unit.

14. A method according to claim 12, further comprising the step of changing said predetermined time period of said timer in response to operation of any of buttons of said operation unit by a user.

15. A method according to claim 9, wherein said portable radio apparatus includes a battery and a receiving unit for receiving a radio signal, and wherein said predetermined information is use state information including at least one of a remaining battery power quantity and electric field strength of said radio signal.

16. A method according to claim 9, wherein said displaying unit includes a display screen and a light source, and wherein said starting step includes:

turning on said light source in response to the operation of any of the specified buttons to back-light said display screen; and turned off said light source in response to said OFF signal.

17. A portable radio apparatus comprising:

a displaying unit with a display screen, for displaying predetermined information in response to an ON signal and for stopping the display of the information in response to an OFF signal;

a detecting section for determining a set of specified buttons, from a plurality of buttons, that require display of said predetermined information on said display screen, and generating a display request based on the determination, the specified buttons being a subset of and less then the plurality of buttons; and a control section for issuing said ON signal to said displaying unit in response to said display request from said detecting section and said OFF signal to said displaying unit such that said predetermined information is displayed on said displaying unit for a time period equal to or longer than a predetermined time period.

18. A portable radio apparatus according to claim 17, wherein said detecting section includes:

an operation unit with buttons including specified buttons, for generating an operation signal in response to operation of any of the specified buttons by a user; and a monitoring section for monitoring said operation signal, and for determining that the user looks at said display screen when said operation signal is received.

19. A portable radio apparatus according to 17, wherein said detecting section determines whether said predetermined information is displayed on said displaying unit, and generates said display request in response to said start signal when it is determined that said predetermined information is not displayed on said displaying unit.

20. A portable radio apparatus according to claim 19, further comprising a timer which starts to count said predetermined time period in response to said display request, and generates said OFF signal when said predetermined time period elapses, and wherein said detecting section resets said timer when it is determined that said predetermined information is not displayed on said displaying unit.

* * * * *